United States Patent
Ueda (10) Patent No.: US 8,910,682 B2
(45) Date of Patent: Dec. 16, 2014

(54) PNEUMATIC TIRE

(75) Inventor: Kenji Ueda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 632 days.

(21) Appl. No.: 13/210,789

(22) Filed: Aug. 16, 2011

(65) Prior Publication Data

US 2012/0042998 A1 Feb. 23, 2012

(30) Foreign Application Priority Data

Aug. 23, 2010 (JP) ................................. 2010-185943

(51) Int. Cl.
*B60C 11/13* (2006.01)
*B60C 11/03* (2006.01)

(52) U.S. Cl.
CPC ......... *B60C 11/0309* (2013.01); *B60C 11/1323* (2013.01)
USPC ............. 152/209.18; 152/209.24; 152/209.25

(58) Field of Classification Search
CPC .. B60C 11/0309; B60C 11/042; B60C 11/12; B60C 11/1307; B60C 11/1323; B60C 11/1353
USPC ............................ 152/209.18, 209.24, 209.25
See application file for complete search history.

(56) References Cited

U.S. PATENT DOCUMENTS

2006/0011280 A1 1/2006 Yagita
2012/0199258 A1* 8/2012 Clayton et al. ............ 152/209.18

FOREIGN PATENT DOCUMENTS

| JP | 2006-27465 A | | 2/2006 |
| WO | WO 2007/028442 | * | 3/2007 |
| WO | WO 2011/049551 | * | 4/2011 |

OTHER PUBLICATIONS

WO 2007/028442, Mar. 2007, English language machine translation [retrieved from www.epo.org].*

* cited by examiner

*Primary Examiner* — Eric Hug
(74) *Attorney, Agent, or Firm* — Birch, Stewart, Kolasch & Birch, LLP (57) ABSTRACT

A pneumatic tire having an enhanced cracking resistance at groove bottom, including at least one circumferential main groove 9 having such a sectional profile shape as including an axially inner wall portion 13, an inner arc portion 14 continuous with the inner wall portion 13, an axially outer wall portion 15 having a smaller length than the inner wall portion 13, an outer arc portion 16 continuous with outer wall portion 15, and a groove bottom portion 17 extending straight between the outer and inner arc portions while being inclined in a radially inward direction, in which the groove 9 has a maximum depth portion 18 on the tire equator side with respect to center position G1 of its width, and radius of curvature R1 of inner arc portion 14 and radius of curvature R2 of outer arc portion 16 satisfy the following relationships: R1≥0.6 mm and R2≥2×R1.

3 Claims, 5 Drawing Sheets

PNEUMATIC TIRE

BACKGROUND OF THE INVENTION

The present invention relates to a pneumatic tire, more particularly to a pneumatic tire including a circumferential main groove having a cross sectional shape specified to reduce generation of cracks in the vicinity of the groove bottom.

Figure 5A:
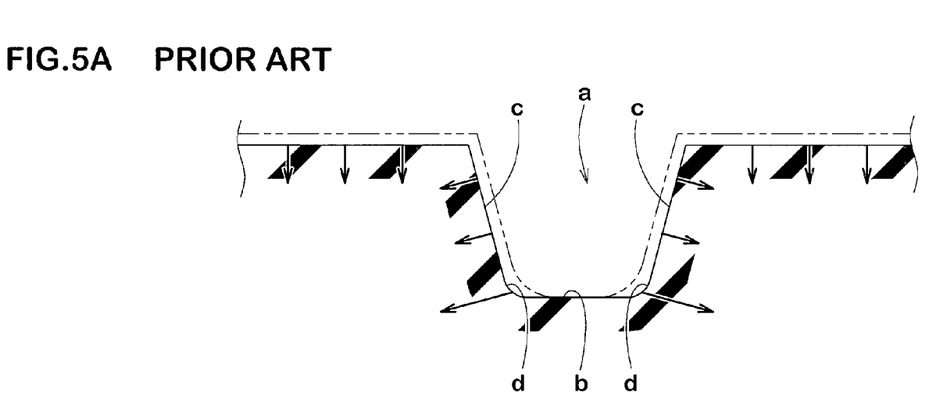
FIGS. 5A and 5B are cross sectional views showing a tread portion of a conventional pneumatic tire.
Figure 5B:
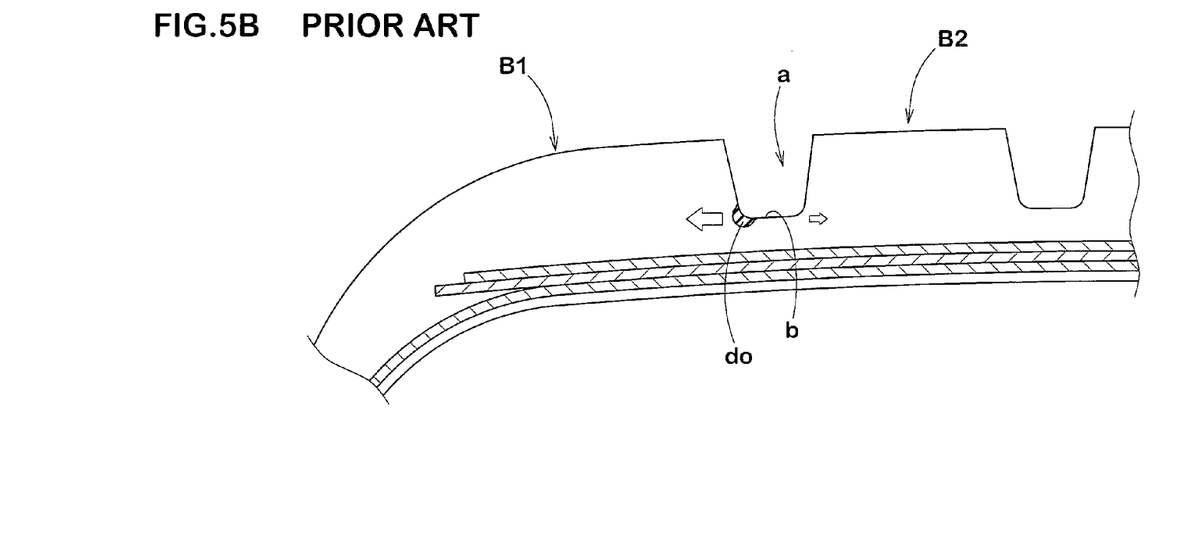

FIG. 5 shows a partial cross sectional view of a tread portion in the vicinity of a circumferential groove of a conventional pneumatic tire, in which an imaginary line shows a cross sectional profile line of the groove just after vulcanization of the tire. In the tread portion of the pneumatic tire, a tensile strain generates in the vicinity of a bottom "b" of a circumferential groove "a" by shrinkage of a rubber due to lowering of temperature after the vulcanization. Such a strain will cause cracking at the groove bottom "b". In particular, cracking is easy to occur at arc-like corner portions "d" between the groove bottom "b" and groove walls "c", since the tensile strain largely acts on the corner portions "d".

Further, as shown in FIG. 5B. a shoulder land portion B1 located on a tread edge side to which a load is easy to apply during cornering, is generally formed into a larger size than a middle land portion B2. Therefore, the amount of rubber shrinkage mentioned above is larger at the shoulder portion, so cracking occurs more easily at an arc-like corner portion "do" located on the shoulder land portion B2 side.

In order to suppress such a cracking at the groove bottom, it is proposed to use a rubber having a high degree of swelling in the tread portion of the tire. However, the rubber having a high degree of swelling tends to deteriorate the rolling resistance and the steering stability of the tire, since the rubber hardness tends to decrease.

In order to improve the cracking resistance at grooves, JP-A-2006-027465 proposes a circumferential groove having a specific cross sectional shape.

It is an object of the present invention to provide a pneumatic tire having an improved resistance to cracking which occurs at a groove bottom and in the vicinity thereof.

This and other objects of the present invention will become apparent from the description hereinafter.

SUMMARY OF THE INVENTION

In the present invention, the cracking resistance of the groove bottom is improved by forming a circumferential main groove to have a specific cross sectional profile shape.

In accordance with the present invention, there is provided a pneumatic tire comprising a tread portion having at least one circumferential main groove extending in a circumferential direction of the tire at a location distant from a tire equator toward an axially outer side, said main groove having a profile shape such that, in a meridian cross section including a rotation axis of the tire in a standard state that the tire is mounted on a standard rim and inflated to a normal inner pressure and no load is applied to the tire, the profile shape includes an inner wall portion extending radially inwardly from an axially inner edge on a tire equator side, an inner arc portion continuous with said inner wall portion and having a smaller radius of curvature than that of said inner wall portion, an outer wall portion extending radially inwardly from an axially outer edge on a tread edge side and having a smaller length than that of said inner wall portion, an outer arc portion continuous with said outer wall portion and having a smaller radius of curvature than that of said outer wall portion, and a groove bottom portion extending straight from said outer arc portion toward said inner arc portion while being inclined in a radially inward direction, whereby said main groove has a maximum depth portion on a tire equator side with respect to a center position of its width, and in which said inner arc portion and said outer arc portion satisfy the following relationships:

$$R1 \geq 0.6 \text{ mm}$$

$$R2 \geq 2 \times R1$$

in which R1 is the radius of curvature of the inner arc portion and R2 is the radius of curvature of the outer arc portion.

Preferably, the center position of the width of the above-mentioned at least one circumferential main groove is located at a position apart from the tire equator by a distance of 10 to 35% of a tread width TW which is an axial distance between both tread edges.

In an embodiment of the present invention, the tread portion has a plurality of shoulder blocks arranged in the circumferential direction on a tread edge side of the above-mentioned at least one circumferential main groove, and the radius of curvature R2 of the outer arc portion of the main groove may be gradually decreased from a center toward both ends of each shoulder block in the circumferential direction.

The above-mentioned at least one circumferential main groove may extend at an angle of 45° or less with respect to the circumferential direction of the tire.

The pneumatic tire of the present invention includes at least one circumferential main groove having a specific cross sectional profile shape as mentioned above. According to the present invention, it is possible to secure a larger rubber volume in a portion radially inward of the groove bottom and on the tread edge side with respect to the groove width center, whereby a larger rigidity is secured in the vicinity of the outer arc portion and, therefore, a strain generating there can be eased to decrease cracking of the inner arc portion of the circumferential main groove. Further, since the groove bottom extends straight, strain can be scattered to decrease cracking at the groove bottom.

Further, in the pneumatic tire of the present invention, the inner and outer arc portions of the specified circumferential main groove have radii of curvature satisfying the following relationships:

$$R1 \geq 0.6 \text{ mm}$$

$$R2 \geq 2 \times R1$$

in which R1 is the radius of curvature of the inner arc portion and R2 is the radius of curvature of the outer arc portion. That is to say, the radius of curvature of the inner arc portion is set to 0.6 mm or more, and the outer arc portion on the tread edge side at which a large tensile strain is easy to generate is formed to have a radius of curvature lager than that of the inner arc portion on the tire equator side by 2 times or more. Since such inner and outer arc portions have a well-balanced rigidity, cracks generating at the both arc portions can be decreased.

DETAILED DESCRIPTION OF THE INVENTION

An embodiment of the present invention will now be explained with reference to the accompanying drawings.

Figure 1:
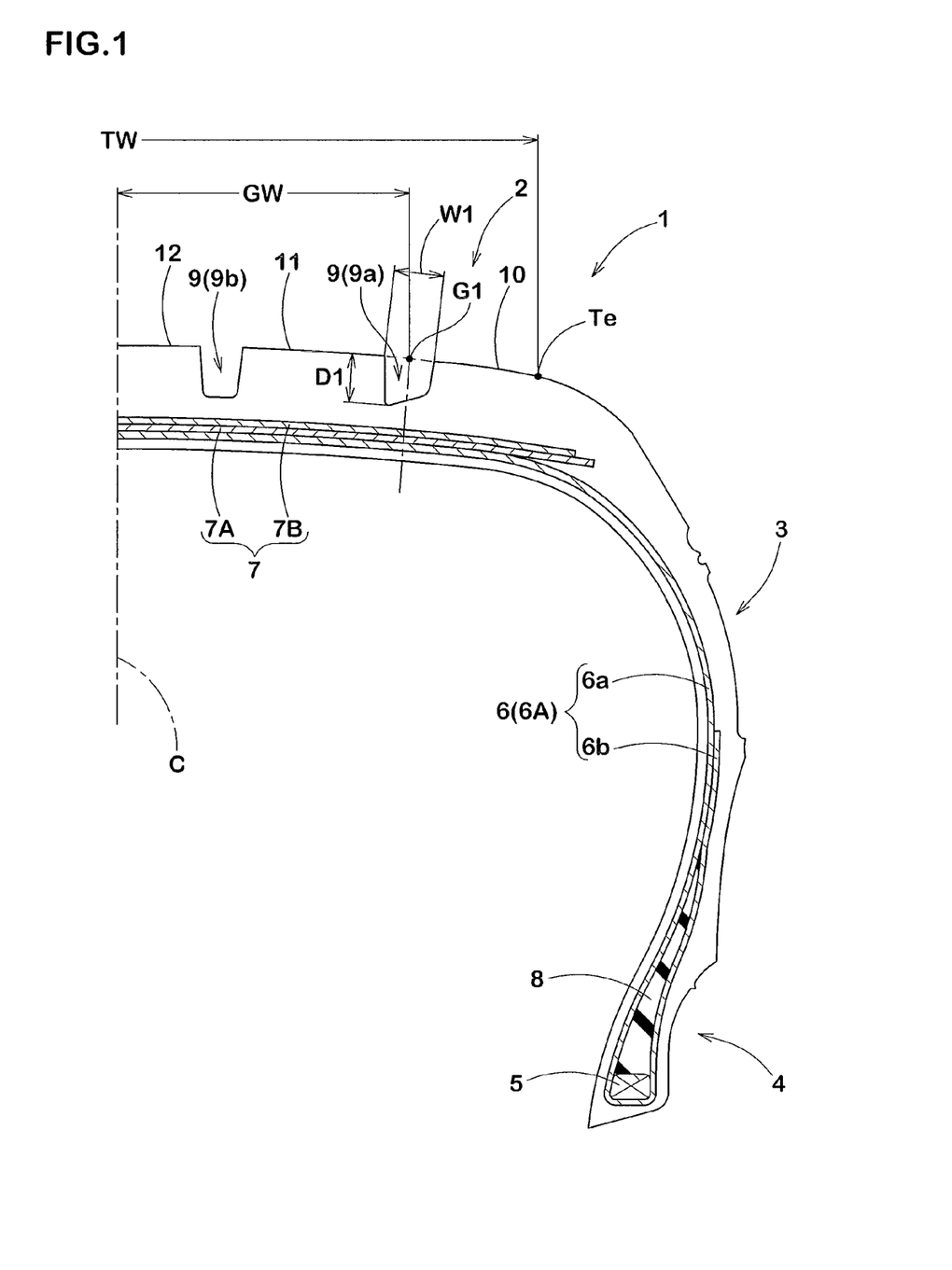
FIG. 1 is a cross sectional view of a pneumatic tire showing an embodiment of the present invention.

FIG. 1 is a meridian section view including a rotation axis of a pneumatic tire 1 according to the present invention in a standard state that the tire is mounted on a standard rim (not shown) and inflated to a normal inner pressure and no load is applied to the tire. In the specification, the "dimensions" of respective parts or portions of the tire denotes those measured in the standard state, unless otherwise noted.

The term "standard rim" denotes a rim defined for every tire in a standardizing system on which the tire is based and, for example, is called "standard rim" in JATMA, "design rim" in TRA and "measuring rim" in ETRTO. Also, the term "normal inner pressure" as used herein means an air pressure defined for every tire in a standardizing system and, for example, denotes "maximum air pressure" in JATMA, maximum value recited in the table of "Tire Load Limits at Various Cold Inflation Pressures" in TRA, and "Inflation Pressure" in ETRTO.

In FIG. 1 is shown a pneumatic tire for passenger cars. In this embodiment, pneumatic tire 1 includes a carcass 6 that extends from a tread portion 2 to each of bead cores 5 in opposing bead portions 4 through sidewall portions 3, and a belt layer 7 that is disposed radially outward of the carcass 6 in the tread portion 2.

The carcass 6 comprises at least one carcass ply 6A (in this embodiment, single carcass ply). The carcass ply 6A is composed of a toroidal main portion 6a that extends from one bead core 5 to the opposing bead core 5, and tumup portions 6b that extend from the both ends of the main portion 6a and are turned up around the bead cores 5 from the axially inside to the axially outside of the tire to thereby anchor the carcass ply. In the carcass ply 6A, carcass cords, e.g., carcass cords made of an organic fiber, are disposed at an angle of, for example, 75 to 90° with respect to the tire circumferential direction. Between the ply main portion 6a and each turnup portion 6b is disposed a bead apex rubber 8 for reinforcement of bead portion 4, that extends radially outwardly from the bead core 5 in a tapered manner.

The belt layer 7 comprises at least two plies, usually three or more plies. The belt plies include belt cords having a high elasticity, e.g., steel cords. The pneumatic tire 1 according to the embodiment shown in FIG. 1 includes a belt layer 7 composed of two belt plies, i.e., a radially inner belt ply 7A and a radially outer belt ply 7B in which the inner ply 7A has a larger width than the outer ply 7B, and belt cords such as steel cords are arranged at an angle of, for instance, 15 to 400 with respect to the tire circumferential direction. The belt plies 7A and 7B are stacked so that the belt cords in one ply cross the cords in the other belt ply.

As shown in FIG. 1, the tread portion 2 is provided with at least one circumferential main groove 9 extending continuously in the tire circumferential direction at a location distant from a tire equator toward an axially outer side. The tread portion 2 in this embodiment is provided with four circumferential main grooves 9 which extend straight and continuously in the tire circumferential direction on both sides of the tire equator C, i.e., a pair of first circumferential main grooves 9a which are disposed on a tread edge Te side, and a pair of second circumferential main grooves 9b which are disposed axially inward of the first circumferential main grooves 9a, whereby on the tread portion 2 are formed a pair of shoulder land portions 10 which extend between the first circumferential main groove 9a and a tread edge Te, a pair of middle land portions 11 which extend between the first circumferential main groove 9a and the second circumferential main groove 9b, and a center land portion 12 which extends between the second circumferential main grooves 9b, 9b. Preferably, the first and second circumferential main grooves are disposed symmetrically with respect to the tire equator C, but the arrangement thereof can be suitably changed.

The term "tread edge Te" as used herein means each of axially outer edges of a ground contact surface of the tire which comes into contact with a ground (flat surface) when the tire in the standard state is loaded with a normal load. The term "normal load" means a load defined for every tire in the standardizing system and is, for example, "maximum load capacity" in JATMA, a maximum value recited in the table of "Tire Load Limits at Various Cold Inflation Pressures" in TRA, and "Load Capacity" in ETRTO, provided that in case of tires for passenger cars, the "normal load" is a load of 88% of the load defined above.

Groove width W1 of the first circumferential main groove 9a is not particularly limited, but from the viewpoint of balance between the rigidity and drainage performance of the shoulder land portion 10, it is preferable that the groove width W1 is 3 mm or more and is 30 mm or less. The term "groove width" as used herein means a width measured in a direction perpendicular to the longitudinal direction of a groove. From the same viewpoint as above, it is also preferable that groove depth D1 of the first circumferential main groove 9a is 3 mm or more and is 15 mm or less.

Location of the first circumferential main groove 9a is not strictly limited. However, axial distance GW between the tire equator and a center position G1 of the width of the groove 9a is too large, a land width of the shoulder land portion 10 is decreased, so the steering stability tends to deteriorate since a large rigidity is not secured for the shoulder land portion 10. On the other hand, if the distance GW is too small, the width of the shoulder land portion 10 becomes excessively large, so cracking tends to easily occur since the tensile strain of the first main groove 9a increases due to rubber shrinkage of the shoulder land portion 10. From such points of view, it is preferable that a ratio GW/TW of the axial distance GW to the tread width TW which is an axial distance between both tread edges Te, Te, is at least 10%, especially at least 15%, and is at most 35%, especially at most 30%.

In this embodiment, the first circumferential main groove 9a is formed into a straight groove that extends straight in the circumferential direction. The straight groove provides a shoulder land portion 10 having a constant width. Therefore, since the tensile strain acting on the first main groove 9a is equalized, cracking is more easily suppressed. However, the first main groove 9a is not limited to a straight groove, but may be other grooves, e.g., a zigzag groove in which each zigzag component is inclined at an angle of preferably at most 45°, more preferably at most 30°, with respect to the tire circumferential direction.

In the present invention, at least one circumferential main groove 9, preferably at least the first circumferential main grooves 9a disposed as shoulder circumferential grooves, have a specific cross sectional profile shape.

Figure 2:
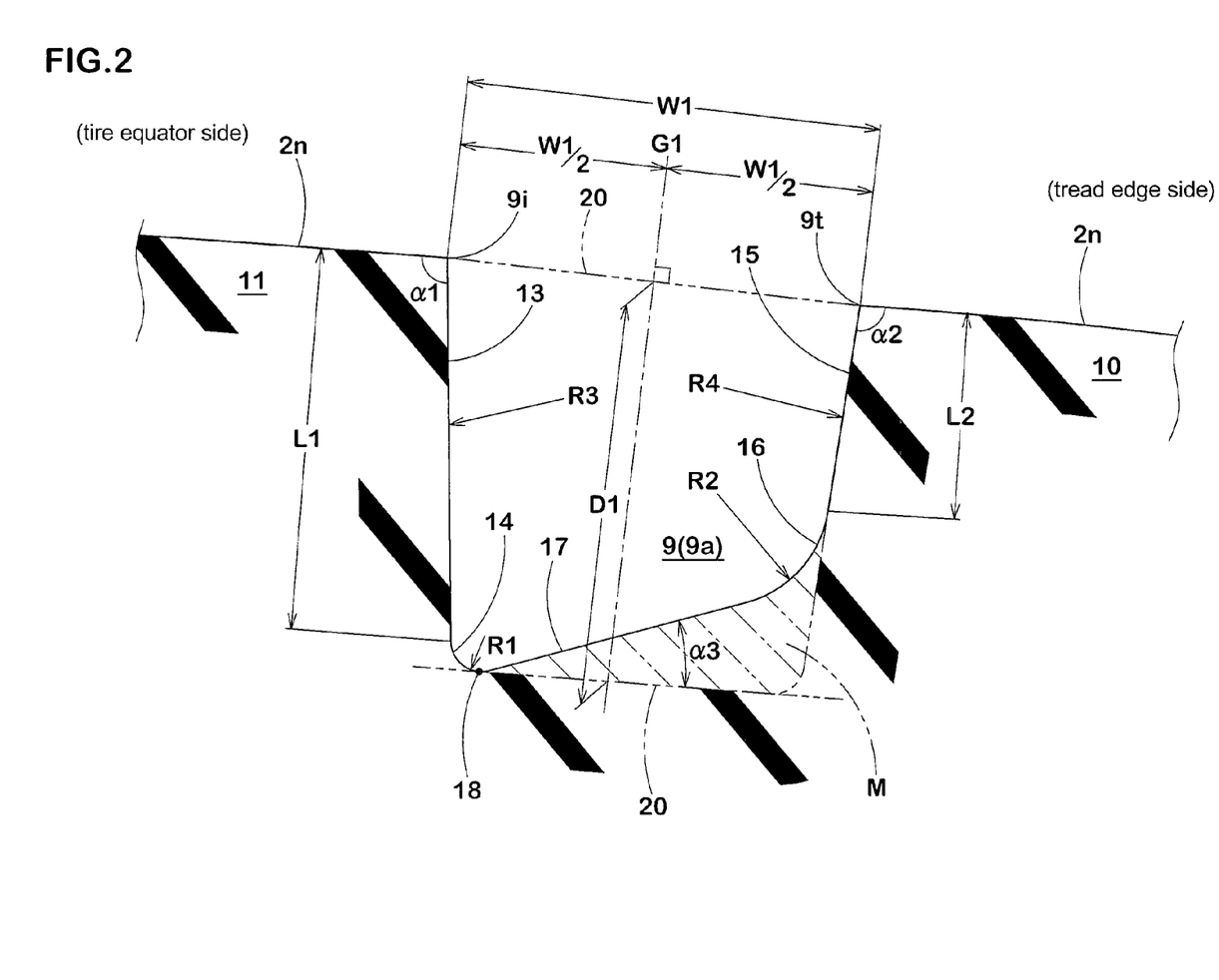
FIG. 2 is a partial enlarged cross sectional view showing a portion in the vicinity of a circumferential main groove of the pneumatic tire.

As shown in FIG. 2, the first circumferential main groove 9a has a profile shape such that, in a meridian cross section including a rotation axis of the tire in a standard state, the profile shape includes an inner wall portion 13 that extends radially inwardly from an axially inner edge 9i on a tire equator side and that may be a flat wall or a curved wall having a radius of curvature R3, an inner arc portion 14 continuous with the inner wall portion 13 and having a smaller radius of curvature R1 than the radius of curvature R3 of the inner wall portion 13, an outer wall portion 15 that extends radially inwardly from an axially outer edge 9t on a tread edge side and has a smaller length than that of the inner wall portion 13 and that may be a flat wall or a curved wall having a radius of curvature R4, an outer arc portion 16 continuous with the outer wall portion 15 and having a smaller radius of curvature R2 than the radius of curvature R4 of the outer wall portion 15, and a groove bottom portion 17 extending straight from the outer arc portion 16 toward the inner arc portion 14 while being inclined in a radially inward direction, whereby the main groove 9a has a maximum depth portion 18 on a tire equator C side with respect to a center position G1 of its width.

The pneumatic tire 1 having such a circumferential main groove 9 can increase the rubber volume to enhance the rigidity of a portion near the outer arc portion 16, since a rubber is disposed in a portion M located radially inward of the groove bottom 17 and on the tread edge side with respect to the groove width center position G1 to raise the groove bottom level. Therefore, the tire 1 can counter the tensile strain resulting from rubber shrinkage that occurs just after the vulcanization of the tire, thus reducing cracks produced in the vicinity of the outer arc portion 16 and the groove bottom 17. Further, according to the present invention, it is possible to prevent a portion near the groove bottom 17 from cracking without conducting change of rubber compounding as conventionally carried out which may bring about deterioration of rolling performance and steering stability. Thus, the pneumatic tire 1 of the present invention can suppress such increase in rolling resistance and deterioration of steering stability as encountered in the prior art.

Further, the groove bottom 17 extends straight from the outer arc portion 16 toward the inner arc portion 14. Since such a groove bottom 17 can scatter a tensile strain with balance, cracking at the groove bottom 17 can be decreased.

The inner wall portion 13 and the outer wall portion 15 in this embodiment have a flat surface, in other words, an infinite (∞) radius of curvature, but are not limited thereto. Each of the inner and outer wall portions 13 and 15 may be formed into a curved surface such as an arc-like curved surface having a radius of curvature of about 5 to about 100 mm. In this case, the inner wall portion 13 is convex toward the tire equator C side and the outer wall portion 15 is convex toward the tread edge Te side. In case of the groove 9a shown in FIG. 2, the inner wall portion 13 is formed to be convex in a lower left direction and the outer wall portion 15 is formed to be convex in a lower right direction, since they are inclined at an angle of more than 90° with respect to a tread surface 2n.

A corner between each of the inner and outer wall portions and the groove bottom 17 is formed into an arc-like shape in cross section. The inner arc portion 14 is convex toward the tire equator C side (in FIG. 2, convex in a lower left direction), and the outer arc portion 16 is convex toward the tread edge Te side (in FIG. 2, convex in a lower right direction).

In the present invention, it is required that the inner and outer arc portions 14 and 16 of the first circumferential main groove 9a satisfy the following relationships:

$R1 \geq 0.6$ mm $R2 \geq 2 \times R1$ in which R1 is the radius of curvature of the inner arc portion 14 and R2 is the radius of curvature of the outer arc portion 16. If the radius of curvature R1 is less than 0.6 mm, the rigidity of a portion near the inner arc portion 14 becomes too small, so it is difficult to reduce the cracking owing to tensile strain. The larger the radius R1, the larger the rigidity in the portion near the inner arc portion 14 becomes, so the cracking resistance can be further enhanced. However, if the radius R1 is too large, no sufficient groove volume cannot be secured and, therefore, there is a possibility that the wet performance of the tire is deteriorated. From such viewpoints, it is preferable that the radius of curvature R1 of the inner arc portion 14 is at least 0.8 mm, and it is at most 3.0 mm, especially at most 2.0 mm.

Further, if the radius of curvature R2 of the outer arc portion 16 is less than 2×R1, i.e., less than a value of twice the radius R1, the rigidity of a portion near the outer arc portion 16 which is subjected to a larger tensile strain becomes small, so it is difficult to reduce the cracking at this portion. Further, if the radius of curvature R2 of the outer arc portion 16 becomes too large as compared with the radius of curvature R1 of the inner arc portion 14, there is a possibility that a sufficient groove volume is not secured, though the cracking resistance can be enhanced since the rigidity of a portion near the outer arc portion 16 is increased. From such viewpoints, it is preferable that a ratio R2/R1 of the radius of curvature R2 of the outer arc portion 16 to the radius of curvature R1 of the inner arc portion 14 is at least 2.2, especially at least 2.5, and is at most 4.0, especially at most 3.5.

An angle α2 between the outer wall portion 15 and the tread surface 2n at an outer groove edge 9t located on the tread edge side of the groove is not particularly limited. However, if the angle α2 is too large, no sufficient groove volume is not secured, and if the angle α2 is too small, there is a possibility that the rigidity of the shoulder land portion 10 is decreased to deteriorate the steering stability. From such points of view, it is preferable that the angle α2 is 90° or more, especially 95° or more, and it is 120° or less, especially 115° or less.

From the same viewpoints as above, it is preferable that the angle α1 between the inner wall portion 13 and the tread surface 2n at an inner groove edge 9i located on the tire equator side of the groove is 90° or more, especially 95° or more, and it is 120° or less, especially 115° or less.

The inner wall portion 13 of the groove 9a has a radial length L1 larger than a radial length L2 of the outer wall portion 15 of the groove 9a. A ratio L1/L2 is not particularly limited. However, if the ratio L1/L2 is too small, it is difficult to increase the rubber volume of a portion M located radially inward of the groove bottom 17 and on the tread edge Te side with respect to the groove width center position G1. If the ratio L1/L2 is too large, there is a possibility that no sufficient groove volume is secured. From such points of view, it is preferable that the ratio L1/L2 is 110% or more, especially 125% or more, and it is 250% or less, especially 200% or less.

The groove bottom 17 between the inner wall portion 13 and the outer wall portion 15 extends straight from the outer arc portion 16 to the inner arc portion 14 while being inclined radially inwardly. If an inclination angle α3 of the groove bottom 17 is too large, the radius of curvature R1 of the inner arc portion 14 becomes too small, and if the inclination angel α3 is too small, no sufficient volume of the portion M is obtained to increase the rigidity of a portion near the outer arc portion 16. From such points of view, it is preferable that the inclination angel α3 is 10° or more, especially 20° or more, and it is 50° or less, especially 40° or less. The inclination angel α3 denotes an angle between the groove bottom 17 and a plane 20 connecting the inner groove edge 9i with the outer groove edge 9t.

Figure 3A:
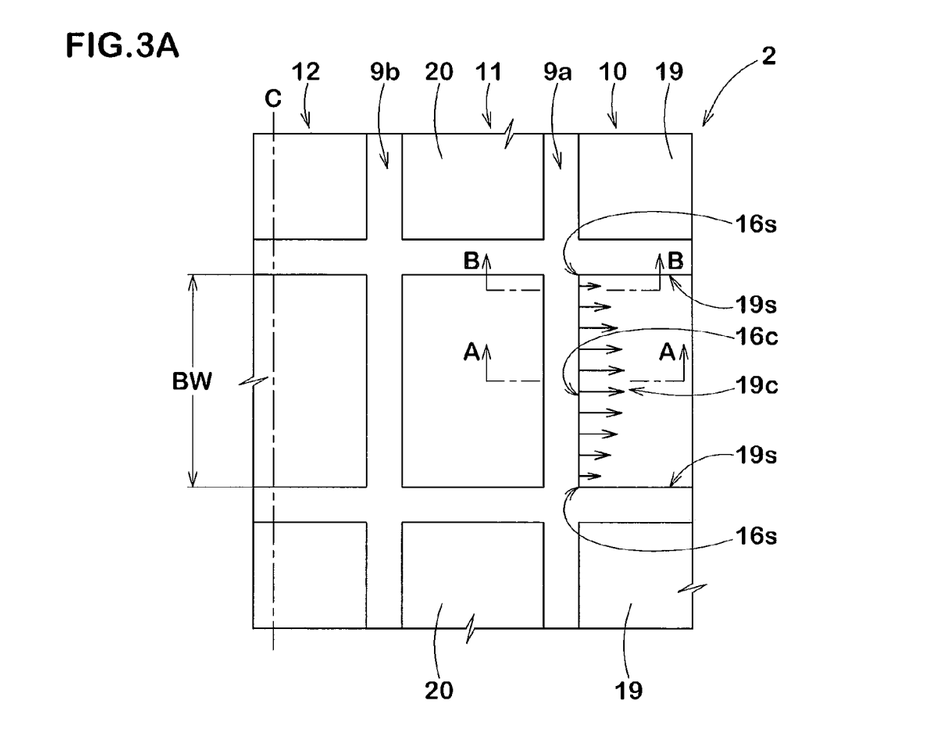
FIG. 3A is a development view showing a right half of a tread portion according to an embodiment of the present invention.

FIG. 3A is a development view showing a right half of the tread portion 2 in the embodiment shown in FIGS. 1 and 2. The shoulder land 10 comprises a row of blocks defined by lateral grooves. Thus, a plurality of shoulder blocks 19 are disposed in the tire circumferential direction on the tread edge Te side of the first circumferential main groove 9a. In this embodiment, the middle land 11 also comprises a row of blocks defined by lateral grooves. Thus, a plurality of middle blocks 20 are disposed in the tire circumferential direction on the tire equator C side of the first circumferential main groove 9a. The middle blocks 20 have the same length BW in the circumferential direction as that of the shoulder blocks 19, and adjacent two middle and shoulder blocks are disposed at the same location in the circumferential direction as shown in FIG. 3A.

Figure 3B:
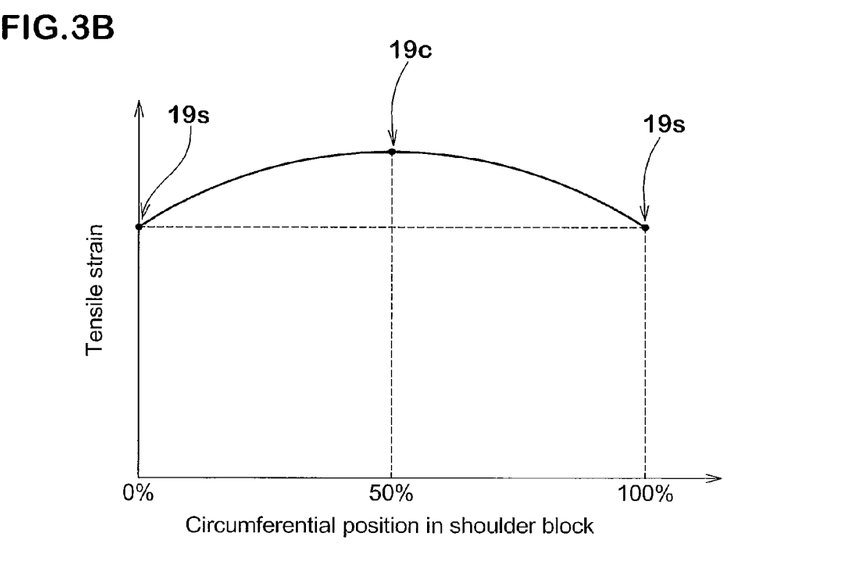
FIG. 3B is a graph showing a relationship between a position of a shoulder block in the circumferential direction and a tensile strain.
Figure 4A:
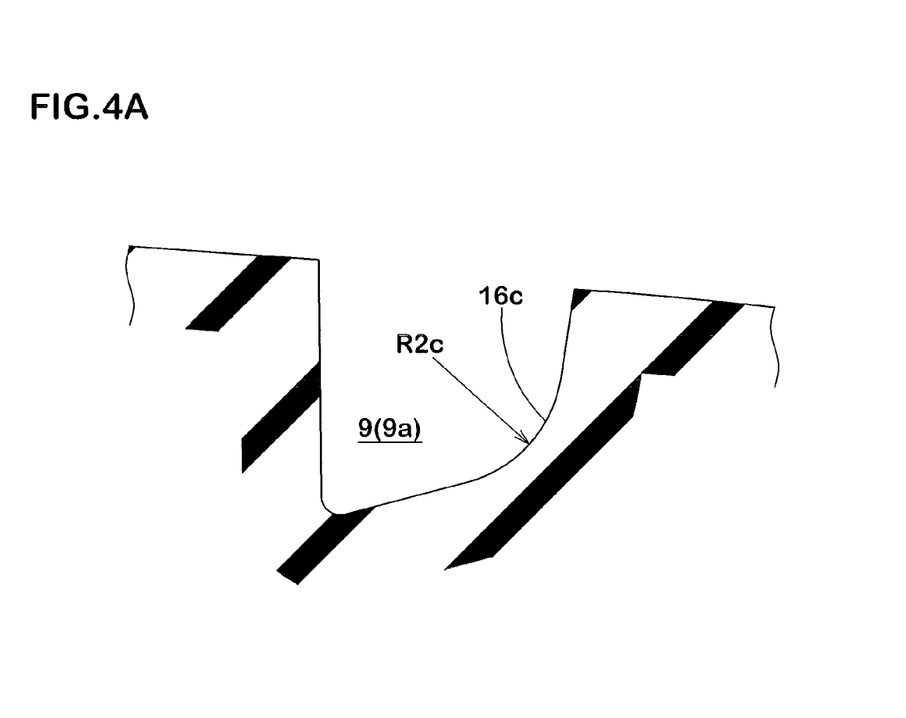
FIG. 4A is a cross sectional view of the circumferential main groove taken on line A-A in FIG. 3A.
Figure 4B:
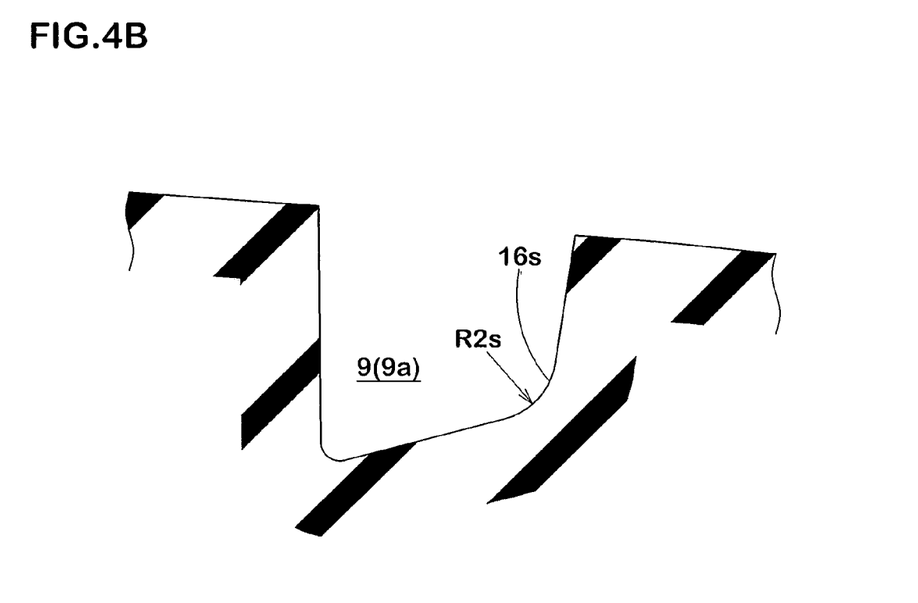
FIG. 4B is a cross sectional view of the circumferential main groove taken on line B-B in FIG. 3A.

In a preferred embodiment according to the present invention, a plurality of shoulder blocks 19 are arranged in the circumferential direction on a tread edge Te side of the first circumferential main groove 9a, and the outer arc portion 16 of the main groove 9a which is located on the shoulder block 19 side has a radius of curvature R2 gradually decreased from a center portion 19c toward both end portions 19s, 19s of each shoulder block 19 in the circumferential direction. As shown in FIGS. 3A and 3B, a tensile strain resulting from shrinkage of rubber acts on the shoulder blocks and the strain is maximum at the center portion 19c of each block 19. Thus, the outer arc portion 16c located at the center portion 19c of each shoulder block 19 is formed to have a relatively large radius of curvature R2c, as shown in FIG. 4A, thereby increasing the rigidity at this location. On the other hand, since the tensile strain is relatively small at both end portions 19s of each shoulder block 19 in the circumferential direction, the outer arc portion 16s located at the end portions 19s of each shoulder block 19 is formed to have a relatively small radius of curvature R2s, as shown in FIG. 4B, thereby securing the groove volume. The pneumatic tire according to this embodiment can suppress generation of cracks while preventing deterioration of drainage performance.

In order to surely exhibit the actions and effects as mentioned above, it is preferable that a rate of change (R2c−R2s)/BW of the radius of curvature R2 of the outer arc portion 16 of the main groove 9a is at least 0.03 and at most 0.3, wherein R2c is a radius of curvature of the outer arc portion 16c located at the center portion 19c of each shoulder block 19, and R2s is a radius of curvature of the outer arc portion 16s located at the both end portions 19s, 19s of each shoulder block 19.

The second circumferential main groove 9b may have a cross sectional profile according to conventional pneumatic tires or may have a cross sectional profile according to the first circumferential main groove 9a.

While preferable embodiments of the present invention have been described with reference to the drawings, it goes without saying that the present invention is not limited to only such embodiments and various changes and modifications may be made. The present invention is more specifically described and explained by means of the following examples and comparative examples. It is to be understood that the present invention is not limited to these examples.

Examples 1 to 16 and Comparative Examples 1 and 2

Pneumatic tires for passenger cars (tire size of 195/65R15) having a tire inner structure as shown in FIG. 1 and having a tread pattern as shown in FIG. 3A were manufactured based on specifications shown in Table 1. Common specifications are shown below in which the term "first circumferential main groove" denotes a groove having a specific cross sectional profile according to the present invention.

Tread width TW: 176 mm

Groove width W1 of first circumferential main groove: 8 mm

Maximum groove depth D1 of first circumferential groove: 8.5 mm

Angle of first circumferential main groove with respect to the circumferential direction: 0°

Circumferential length BW of shoulder block: 20 to 45 mm

Angle α1 of inner wall portion: 94°

Angle α2 of outer wall portion: 94°

Inner and outer wall portions: flat surface (R3=R4=∞)

Rim: 15×6.0J

The tensile strain at groove bottom of the first circumferential main groove and the wet performance of the tires were measured according to the following methods.

<Tensile Strain>

Pneumatic tires were prepared in which five strain sensors were attached to a tread edge side of the first circumferential main groove at regular intervals over the full circumferential length of one shoulder block. The radial height of the attached sensors measured from the plane 20 passing through the maximum groove depth portion 18 was 0.5 mm. A sensor element unit in which a magnet and a hall element were integrated with a rubber elastic material was used as the strain sensor. The tensile strain at each point was measured under conditions of inner pressure 230 kPa and no loading.

The maximum tensile strain is shown by an index based on the result of Comparative Example 1 regarded as 100. A difference between the maximum tensile strain and the minimum tensile strain was also obtained for each tire, and it is shown by an index based on the result of Comparative Example 1 regarded as 100. The smaller the value, the better the cracking resistance.

<Wet Performance>

The tires were mounted on each rim, inflated to an inner pressure of 230 kPa and attached to all wheels of a 2,000 cc passenger car. The test car was run under condition of a single ride of only driver on a wet asphalt road of a tire test course, and the wet performance was evaluated by driver's feeling. The results are shown by an index based on the result of Comparative Example 1 regarded as 100. The lager the value, the better the wet stability.

The results are shown in Table 1.

It is observed in Table 1 that the pneumatic tires of the Examples according to the present invention produce a good result for strain performance while suppressing deterioration of wet performance, as compared with the Comparative Examples.

TABLE 1

|  | Com. Ex. 1 | Com. Ex. 2 | Ex. 1 | Ex. 2 | Ex. 3 | Ex. 4 | Ex. 5 | Ex. 6 | Ex. 7 |
|---|---|---|---|---|---|---|---|---|---|
| Radius of curvature R1 of inner arc portion (mm) | 0.5 | 0.6 | 0.6 | 0.8 | 1.0 | 2.0 | 0.8 | 0.8 | 0.8 |
| Radius of curvature R2 of outer arc portion (mm) | 1.0 | 1.0 | 1.2 | 1.6 | 2.0 | 4.0 | 2.0 | 2.4 | 2.8 |
| Ratio L1/L2 of radial length L1 of inner wall portion to radial length L2 of outer wall portion (%) | 155 | 155 | 155 | 155 | 155 | 155 | 155 | 155 | 155 |
| Ratio GW/TW of axial distance GW between first circumferential main groove and tire equator to tread width TW (%) | 8 | 8 | 8 | 8 | 8 | 8 | 8 | 8 | 8 |
| Rate of change (R2c − R2s)/BW in the circumferential direction of radius of curvature of outer arc portion (%) | 0 | 0 | 0 | 0 | 0 | 0 | 0 | 0 | 0 |
| Maximum tensile strain (index) | 100 | 99 | 98 | 97 | 95 | 93 | 90 | 88 | 87 |
| Difference between maximum and minimum tensile strain (index) | 100 | 100 | 100 | 100 | 100 | 100 | 100 | 100 | 100 |
| Wet performance (index) | 100 | 100 | 100 | 98 | 96 | 90 | 96 | 95 | 93 |

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Radius of curvature R1 of inner arc portion (mm) | 0.8 | 0.8 | 0.8 | 0.8 | 0.8 | 0.8 | 0.8 | 0.8 | 0.8 |
| Radius of curvature R2 of outer arc portion (mm) | 3.6 | 2.4 | 2.4 | 2.4 | 2.4 | 2.4 | 2.4 | 2.4 | 2.4 |
| Ratio L1/L2 of radial length L1 of inner wall portion to radial length L2 of outer wall portion (%) | 155 | 155 | 155 | 155 | 155 | 155 | 155 | 155 | 155 |
| Ratio GW/TW of axial distance GW between first circumferential main groove and tire equator to tread width TW (%) | 8 | 15 | 25 | 35 | 40 | 25 | 25 | 25 | 25 |
| Rate of change (R2c − R2s)/BW in the circumferential direction of radius of curvature of outer arc portion (%) | 0 | 0 | 0 | 0 | 0 | 3 | 10 | 25 | 40 |
| Maximum tensile strain (index) | 87 | 86 | 84 | 83 | 84 | 84 | 85 | 86 | 87 |
| Difference between maximum and minimum tensile strain (index) | 100 | 100 | 100 | 100 | 100 | 98 | 94 | 96 | 97 |
| Wet performance (index) | 92 | 95 | 95 | 95 | 95 | 96 | 98 | 96 | 95 |

What is claimed is:

1. A pneumatic tire comprising:
a tread portion provided with a circumferential main groove extending in a circumferential direction of the tire at a location distant from the tire equator toward an axially outer side thereof,
said circumferential main groove having a profile shape such that,
in a meridian cross section of the tire including the rotation axis of the tire in a standard state that the tire is mounted on a standard rim and inflated to a normal inner pressure and no load is applied to the tire,
the profile shape includes
an inner wall portion extending radially inwardly from an axially inner edge of the groove on a tire equator side,
an inner arc portion continuous with said inner wall portion and having a smaller radius of curvature than that of said inner wall portion,
an outer wall portion extending radially inwardly from an axially outer edge of the groove on a tread edge side and having a smaller length than that of said inner wall portion,
an outer arc portion continuous with said outer wall portion and having a smaller radius of curvature than that of said outer wall portion, and
a groove bottom portion extending straight from said outer arc portion toward said inner arc portion while being inclined in a radially inward direction,
wherein said circumferential main groove has a maximum depth portion on a tire equator side of a center position of its width,
wherein
said inner arc portion has a radius of curvature R1 and said outer arc portion has a radius of curvature R2 that satisfy the following relationships:
R1≥0.6 mm, and
R2≥2×R1,
and wherein
on the tread edge side of said circumferential main groove, a plurality of shoulder blocks are disposed circumferentially of the tire, and
with respect to each said shoulder block, the radius of curvature R2 is gradually decreased from a center portion toward both end portions of the block in the tire circumferential direction.

2. The pneumatic tire of claim 1, wherein the center position of the width of said circumferential main groove is located at a position apart from the tire equator by a distance of 10 to 35% of a tread width TW which is an axial distance between the tread edges.

3. The pneumatic tire of claim 1, wherein said circumferential main groove extends at an angle of 45° or less with respect to the circumferential direction of the tire.

* * * * *